(12) United States Patent
Shigahara et al.

(10) Patent No.: US 6,782,696 B2
(45) Date of Patent: Aug. 31, 2004

(54) CONTROL DEVICE AND METHOD FOR A DIESEL ENGINE AND DIESEL ENGINE

(75) Inventors: Kei Shigahara, Aichi (JP); Michihiro Hata, Aichi (JP); Toshinori Morita, Aichi (JP); Noriyuki Koga, Aichi (JP); Yuji Yanagawa, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 135 days.

(21) Appl. No.: 10/287,688

(22) Filed: Nov. 5, 2002

(65) Prior Publication Data
US 2003/0084660 A1 May 8, 2003

(30) Foreign Application Priority Data

Nov. 5, 2001 (JP) .................................... P2001-339517

(51) Int. Cl.[7] ................................................. F01N 3/00
(52) U.S. Cl. ............................ 60/285; 60/274; 60/278
(58) Field of Search ........................... 60/278, 285, 274

(56) References Cited

U.S. PATENT DOCUMENTS

| | | | | |
|---|---|---|---|---|
| 5,732,554 A | * | 3/1998 | Sasaki et al. | 60/278 |
| 5,890,360 A | * | 4/1999 | Sasaki et al. | 60/278 |
| 5,937,639 A | | 8/1999 | Sasaki et al. | |
| 5,974,792 A | * | 11/1999 | Isobe | 60/278 |
| 6,269,791 B1 | * | 8/2001 | Tanaka et al. | 123/300 |
| 6,370,870 B1 | * | 4/2002 | Kamijo et al. | 60/286 |
| 6,470,850 B1 | * | 10/2002 | Sasaki et al. | 123/305 |
| 6,490,857 B2 | * | 12/2002 | Sasaki | 60/278 |
| 6,546,721 B2 | * | 4/2003 | Hirota et al. | 60/297 |

FOREIGN PATENT DOCUMENTS

| | | |
|---|---|---|
| EP | 0 905 361 A2 | 3/1999 |
| EP | 1 098 080 A1 | 5/2001 |
| EP | 1 132 597 A1 | 9/2001 |

* cited by examiner

*Primary Examiner*—Thomas Denion
*Assistant Examiner*—Diem Tran
(74) *Attorney, Agent, or Firm*—Birch, Stewart, Kolasch & Birch, LLP (57) ABSTRACT

A low $NO_x$ combustion mode is executed in which the fuel injected timing IT is greatly advanced to 36° BTDC as compared with a normal value of roughly 10° BTDC. At this fuel injection timing IT, the smoke emission amount is suppressed below an extremely low value, even if the EGR ratio Regr is increased to about 56%, and the $NO_x$ emission amount is suppressed owing to a large amount of EGR, so that the smoke and $NO_x$ can be reduced at the same time.

17 Claims, 5 Drawing Sheets

CONTROL DEVICE AND METHOD FOR A DIESEL ENGINE AND DIESEL ENGINE

BACKGROUND OF THE INVENTION

1. Field of the Invention

The present invention relates to a diesel engine, particularly to a control of fuel injection timing and EGR recirculation quantity.

2. Description of the Related Art

In a diesel engine that performs a lean operation mainly caused by diffusion combustion, $NO_x$ is likely to occur by a high excess air ratio. As its countermeasure, an EGR control is used in which a part of exhaust gas is recirculationed into an intake air system and a combustion temperature is decreased to suppress the generation of $NO_x$. Though the $NO_x$ suppression effect is enhanced along with an increased EGR ratio, in the diffusion combustion in which combustion is caused on a combustible gas mixture layer at the boundary between injection fuel and compressed air, a cinder of fuel occurs if the EGR ratio is excessively increased, resulting in a problem that the smoke emission amount is rapidly increased. Therefore, to avoid this problem, the EGR ratio had an upper limit value, so that the $NO_x$ suppression could not be fully realized.

In JP-A-8-218920 (U.S. Pat. No. 5,732,554), a technique for discharging $NO_x$ from the $NO_x$ occluded substance provided in an exhaust system of the diesel engine was disclosed. Fuel is injected in a suction stroke and a large quantity of EGR gas is introduced to lower the excess air ratio at or below 1.0 thereby exhausting the $NO_x$. The combustion state is changed to a premix combustion in which an injected fuel is diffused and vaporized before the top dead center of compression, premixed with the air and combusted, whereby the cinder of fuel is less likely to arise, causing the upper limit value of the EGR ratio to be raised. Thus, it is presumed that the smoke and $NO_x$ can be both reduced.

On the other hand, JP-B-3116876 (U.S. Pat. No. 5,937,639) discloses a technique for controlling the EGR ratio when the smoke emission amount tends to decrease in a predetermined area such as a low load condition in order to reduce both of the smoke and $NO_x$. It is noted that if the EGR ratio is increased above the upper limit value, the smoke emission amount tends to decrease after rapidly increased to the peak.

However, with the first technique, since there is a long interval from fuel injection in a suction stroke to ignition in a compression stroke, there is a problem that the ignition timing is varied, likely causing an ignition failure such as preignition or ignition delay and a degradation of stability. Also, a part of the fuel injected in the suction process is diffused within a cylinder and deposited on a cylinder wall to cause an oil dilution, and is not captured within a cavity of a piston like the fuel injected at a timing of the top dead center of compression, resulting in a problem that hydrocarbon (HC) or carbon monoxide (CO) is rapidly increased.

Also, with the second technique, when the control mode is switched between the predetermined area and the other areas, the peak of the smoke emission amount appears. Thus, there is a problem that the smoke emission amount is necessarily rapidly increased transiently at every time of mode switching.

SUMMARY OF THE INVENTION

It is an object of the present invention to provide a diesel engine that can reduce both of smoke and $NO_x$ by increasing an upper limit value of EGR ratio for suppressing emission of smoke while preventing oil dilution or increase in HC or CO from occurring.

In order to achieve the above object, the present invention provides a control device for a diesel engine wherein a fuel injection timing by a fuel injection part for injecting a fuel into a combustion chamber of the engine is set at an advance side from an injection timing when the smoke emission characteristic indicates a decreasing tendency after indicating an increasing tendency in accordance with an increase in an EGR ratio, and a lag side from an injection timing when the injected fuel gets out of a cavity formed in a piston and gets to a cylinder wall face, and an EGR ratio adjusting part for adjusting a recirculation amount of exhaust gas exhausted from the engine into an intake air system is operated to reduce the smoke emission amount and the $NO_x$ emission amount from the engine at the same time.

Figure 5:
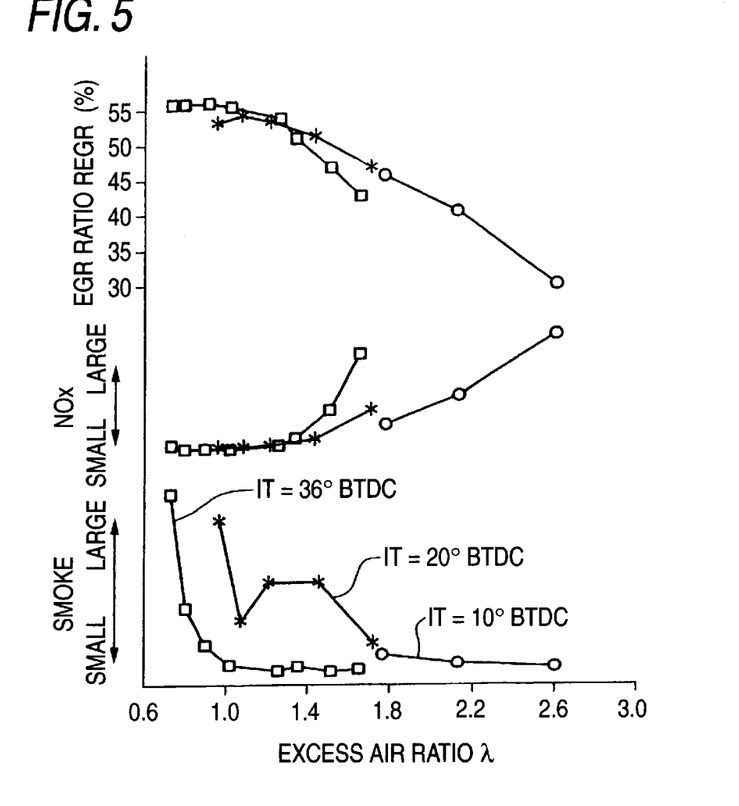
FIG. 5 is a characteristic graph showing the test results excerpted from FIG. 4, when the fuel injection timing IT is 10, 20 and 36° BTDC.

The smoke emission characteristic for the EGR ratio is changed depending on the injection timing. FIG. 5 shows an example of the results of a test in which the fuel injection timing is changed in a certain operating range. If the injection timing is advanced to 20° BTDC as compared with 10° BTDC that is applicable to the typical diesel engine, the smoke emission amount for an increase in the EGR ratio indicates an increasing tendency up to a peak, and then a decreasing tendency. In this case, if the excess air ratio is changed with the EGR ratio, the smoke emission amount is over the peak, whereby it is impossible to avoid a rapid transient increase of the smoke emission amount. On the contrary, at 36° BTDC to which the injection timing is further advanced, the smoke emission amount is suppressed to the low value, even if the EGR ratio is increased, and the $NO_x$ emission amount is suppressed by the high EGR ratio, whereby the smoke and $NO_x$ can be reduced at the same time, and the transient increase of smoke is suppressed because no peak of the smoke emission amount is formed.

In this manner, the smoke emission amount is suppressed by the advanced injection timing, because the period from fuel injection to ignition is extended to promote the premix between injected fuel and intake air. In a suction stroke injection, for example, the injection timing is not extremely advanced, so that the injected fuel is surely ignited at a predetermined timing neat the top dead center of compression, and the stable operation is enabled without ignition failure.

Figure 6:
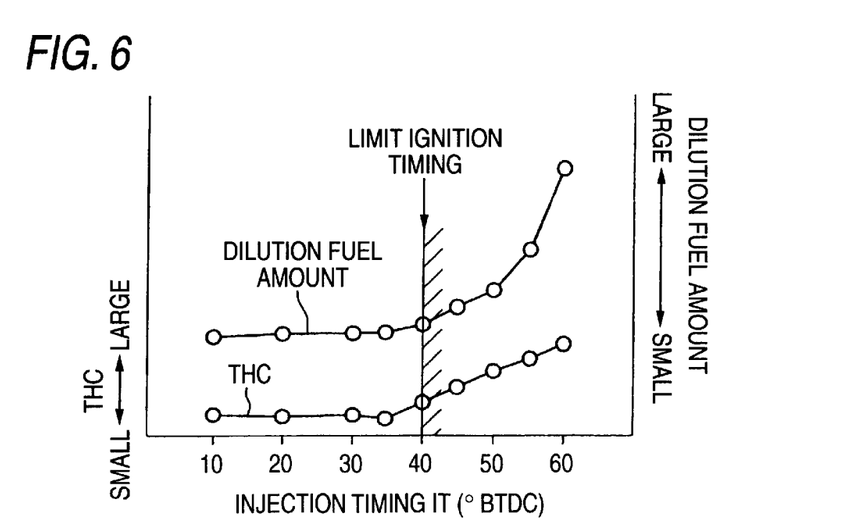
FIG. 6 is a characteristic graph showing the test results measuring the THC emission and the dilution fuel amount.

On the other hand, FIG. 6 shows the test results of measuring the THC emission amount and the dilution fuel amount by changing the injection timing in the same operation range as in FIG. 5. If the injection timing is advanced, THC is increased from around 40° BTDC, and the amount of fuel mixed into the engine oil is increased, bringing about a danger of oil dilution.

In view of the above main causes, if the fuel injection timing is set at an advance side from the injection timing when the smoke emission characteristic indicates an increasing tendency and then a decreasing tendency for an increase in the EGR ratio, and a lag side from the injection timing when the injected fuel gets out of a cavity formed in a piston and gets to a cylinder wall face, the problem with the increased THC or oil dilution due to excessive advance is prevented, and the upper limit value of the EGR ratio to suppress the exhaust of smoke can be increased. And since the recirculation amount of exhaust gas is controlled on the basis of this EGR ratio by the EGR adjusting means, the smoke emission amount and the $NO_x$ emission amount can be reduced at the same time.

In a preferred form, the injection timing is advanced along with the increase in the engine rotational speed.

In this case, if the piston speed is increased with the engine rotational speed, the timing when the injected fuel get into the cavity occurs relatively earlier. Therefore, to bring the injected fuel into the cavity at an appropriate timing, it is required to expedite the fuel injection up to the time when the piston position is still low. Hence, if the injection timing is advanced with the increase of the engine rotational speed, the injected fuel is always brought into the cavity of the piston at appropriate timing, irrespective of the engine rotational speed, whereby a combustible state consistent with the smoke and $NO_x$ is stably realized.

Also, the injection timing is desirably kept almost constant for a change in the load.

In this case, since the dependency of the injection timing on the engine load is lower than on the engine rotational speed, if the injection timing is kept almost constant for a change in the load, the combustible state consistent with the smoke and $NO_x$ can be stably realized without being affected by the variation in the engine load.

Preferably, the operation of the EGR ratio adjusting means is controlled so that the EGR ratio may be 50% or greater and the excess air ratio may be 1.0 or more.

In this case, if the EGR ratio is 50% or greater, $NO_x$ can be reduced efficiently owing to a large amount of EGR, and if the excess air ratio is 1.0 or more, the exhaust of HC or CO can be effectively suppressed. Consequently, the comprehensive emission exhaust characteristic can be improved.

When a catalyst having an oxidation function is provided in the exhaust system, it is preferable that execution of the invention or the first control mode is inhibited when the catalyst is inactive.

Accordingly, a large amount of EGR in the first control mode leads to decreasing excess air, so that the emission amount of HC or CO tends to increase, but the exhausted HC or CO is surely purged due to the oxidation function of catalyst. On the other hand, when the catalyst is inactive, execution of the first control mode is inhibited, so that HC or CO exhausted from the engine is decreased with the smaller EGR amount, thereby preventing the exhaust of HC or CO.

Moreover, when a second control mode is provided in which the injection timing is set near the top dead center of compression to lag behind the first control mode, and the EGR ratio is lower than in the first control mode, the injection timing is momentarily switched in the middle during an EGR ratio change period where the EGR ratio is gradually changed, when switching between the first control mode and the second control mode depending on the operating conditions of the engine.

In the first control mode, though the problem with the increasing HC or CO and the oil dilution as previously described is prevented, the upper limit value of the EGR ratio to suppress the exhaust of smoke is increased, so that the smoke emission amount and the $NO_x$ emission amount can be reduced at the same time.

Also, in the second control mode, in contrast to the first control mode, because the injection timing is lagged and the EGR ratio is smaller, the mode switching means switches the control mode into the second control mode to cope with an output requirement in an operating condition with high output requirement from the driver.

On the other hand, when the control mode is switched by the mode switching means, the EGR ratio is gradually changed due to recirculation of the exhaust gas, but if the injection timing is gradually changed in accordance with the change characteristic, the smoke may be temporarily increased in a state where the injection timing and the EGR ratio are in the range for rapidly increasing the smoke.

Figure 4:
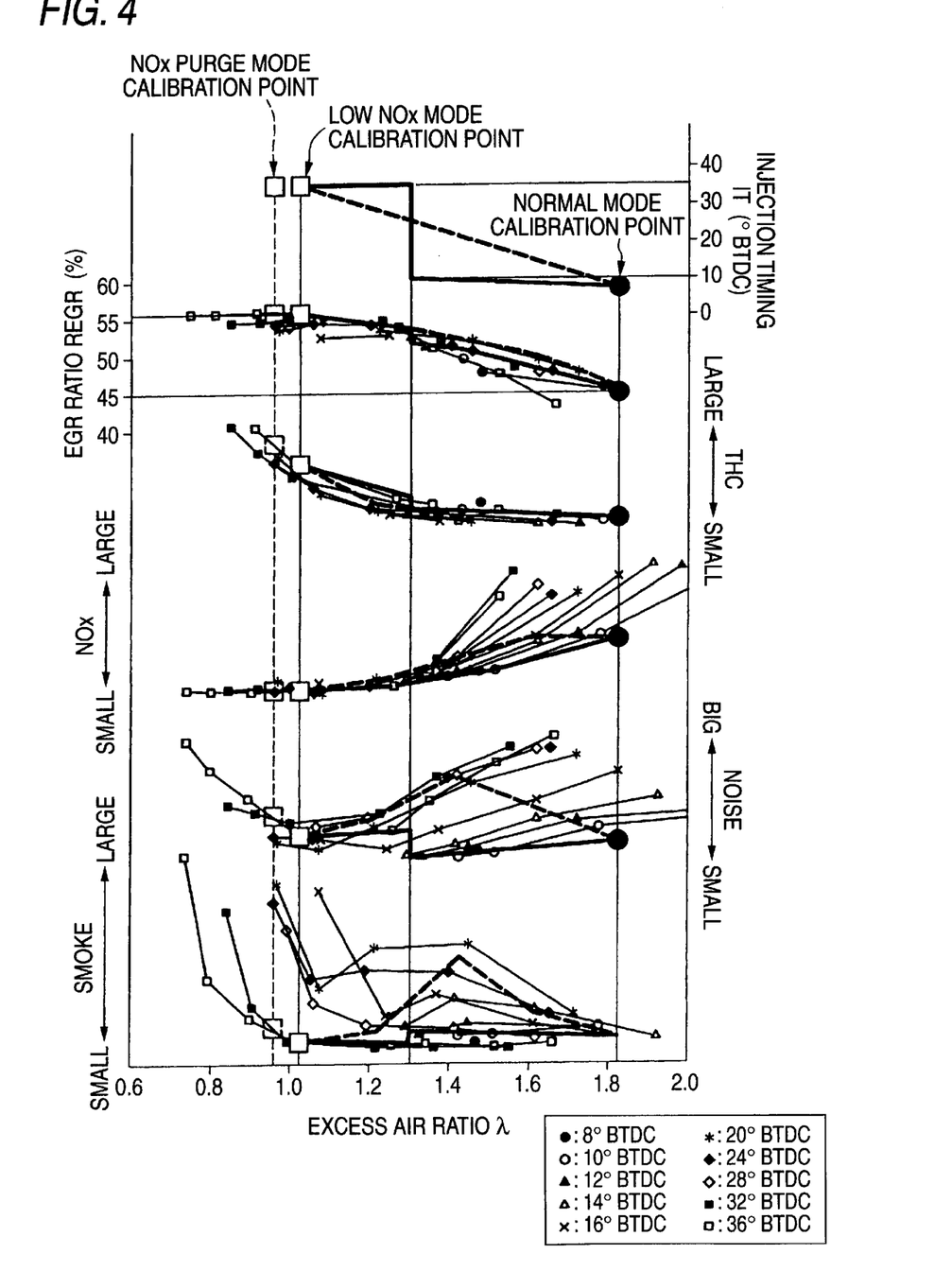
FIG. 4 is a characteristic graph showing a control situation for a fuel injection timing IT and an EGR ratio Regr in a normal combustion mode and a low $NO_x$ combustion mode, and test results of measuring THC emission amount, $NO_x$ emission amount, noise, and smoke emission amount when the fuel injection timing IT is set at 8 to 36° BTDC.

For example, FIG. 4 shows the test results in which the injection timing is further subdivided in the same operating range as in FIG. 5. In FIG. 4, the characteristic is indicated with a sign ● for IT=8° BTDC. In the same manner, the characteristic is indicated with sign ○ for 10° BTDC, sign ▲ for 12° BTDC, sign Δ for 14° BTDC, sign x for 16° BTDC, sign ★ for 20° BTDC, sign ◆ for 24° BTDC, sign ◇ for 28° BTDC, sign ■ for 32° BTDC, and sign □ for 36° BTDC.

In FIG. 4, the second control mode is indicated with a large sign ●, in which the injection timing is set at 8° BTDC, the EGR ratio Regr is set at 45%, and the excess air ratio λ is controlled to be around 1.8. On the contrary, the first control mode is indicated with a large sign □, in which the injection timing is set at 36° BTDC on the far advance side, and the EGR ratio Regr is set at 56%, so that the excess air ratio λ is controlled to be 1.0 or on the slightly lean side.

When the injection timing is set somewhere from 14 to 32° BTDC in a transient range of the excess air ratio λ from 1.0 to 1.8, there occurs a phenomenon that the noise is increased mainly on the lean side, or the smoke is increased mainly on the lean side. Hence, the noise and the smoke are inconsistent. Accordingly, when the control mode is switched between the first control mode and the second control mode, if the injection timing is gradually changed in accordance with the broken line of FIG. 4, the range of 14 to 32° BTDC is necessarily passed, whereby it is not possible to avoid the region where the noise or the smoke is rapidly increased.

On the contrary, when the injection timing is set at 8 or 10° BTDC, the noise and the smoke can be reduced in the region on the lean side from the excess air ratio λ of about 1.3. On the other hand, when the injection timing is set at 36° BTDC, the noise and the smoke can be reduced in the region on the rich side from the excess air ratio λ of about 1.3. Hence, in this example, the injection timing may be changed momentarily at the excess air ratio λ=1.3, as indicated by the solid line in FIG. 4.

In the above example, since the injection timing is momentarily switched in the middle during an EGR ratio change period where the EGR ratio is gradually changed, the control mode is switched to pass over the region where the smoke is rapidly increased. Consequently, it is possible to avoid beforehand a temporary increase of the smoke during the EGR ratio change period.

The first control mode is preferably executed when the operating range of the engine is in a low load region, whereby the control can be performed without trouble in the low load region where the required fuel amount is smaller even if the amount of air is decreased due to a large amount of EGR.

In another preferred form, when the engine has an $NO_x$ catalyst for occluding $NO_x$ in the exhaust system, it is preferable that the operation of the fuel injection means and the EGR ratio adjusting means is controlled so that the fuel injection timing may be almost equal to that of the first control mode, and the excess air ratio may be less than 1.0 at a time of purging $NO_x$ from the $NO_x$ catalyst.

In this case, since the fuel injection timing is set up at an advance side from the injection timing when the smoke emission characteristic indicates an increasing tendency and then a decreasing tendency for an increase in the EGR ratio, the range of the EGR ratio to maintain the smoke emission amount at a low level can be extended. Moreover, since the operation of the EGR ratio adjusting means is controlled so that the excess air ratio maybe 1.0 or less, the EGR ratio can be increased without worrying about the smoke emission amount to discharge and reduce $NO_x$ from the $NO_x$ occluded catalyst efficiently.

DETAILED DESCRIPTION OF THE PREFERRED EMBODIMENTS

First Embodiment

The present invention will be described below in connection with a diesel engine of the common rail system.

Figure 1:
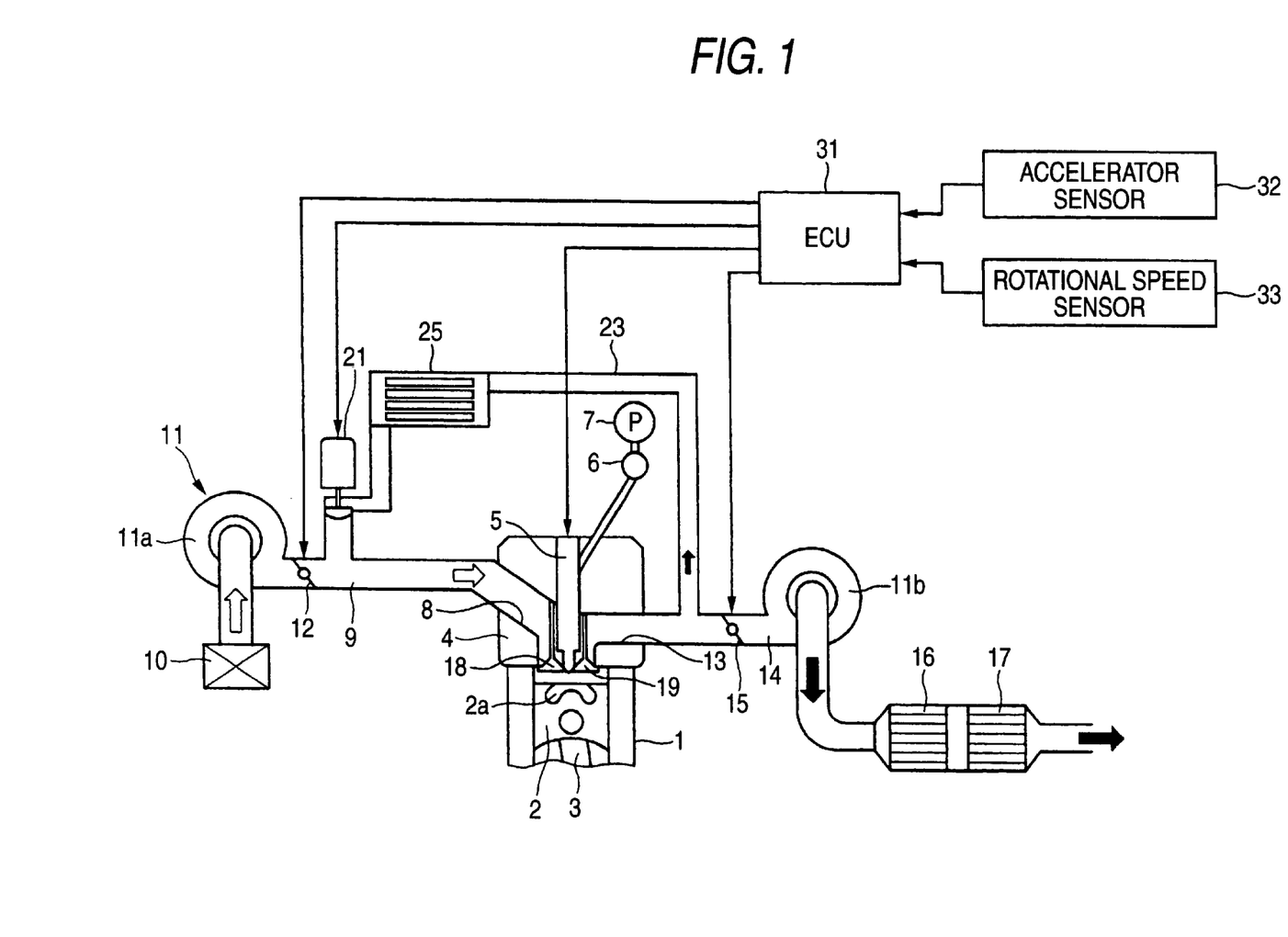
FIG. 1 is an overall constitutional view of a diesel engine according to a first embodiment of the present invention.

FIG. 1 is an overall constitutional view of the diesel engine according to the first embodiment. In FIG. 1, one-cylinder of the diesel engine is represented, in which a piston 2 disposed within a cylinder block 1 is connected via a connecting rod 3 to a crankshaft (not shown). In a cylinder head 4 of the engine, a fuel injection valve 5 is disposed to be confronted into the cylinder, and connected to a common rail 6 that is common to each cylinder. A fuel pump 7 is connected to the common rail 6 so that a high pressure fuel supplied from the fuel pump 7 is reserved within the common rail 6.

The fuel injection valve 5 is opened at a predetermined timing near the top dead center of compression, so that a high pressure fuel within the common rail 6 is injected from the fuel injection valve 5 to a cavity 2a in the head portion of the piston, ignited and combusted in the compressed air to push the piston 2 downward (fuel injection part). The constitution of a common rail system is well-known, and not described in detail. The fuel injection quantity and the injection timing can be arbitrarily set by controlling an open state of the fuel injection valve 5.

Each cylinder is connected via a suction port 8 formed in the cylinder head 4 to a common suction passage 9. In the suction passage 9, there are provided an air cleaner 10, a compressor 11a of a turbo charger 11 and a suction throttle valve 12, in this order from the upstream side of the suction passage 9. Also, each cylinder is connected via an exhaust port 13 of the cylinder head 4 to a common exhaust passage 14. In the exhaust passage 14, there are provided an exhaust throttle valve 15, a turbine 11b of the turbo charger 11 provided coaxial with the compressor 11a, an occluded $NO_x$ catalyst 16, an oxidation catalyst 17, and a noise eliminator (not shown), in this order from the upstream side of the exhaust passage 14. The occluded $NO_x$ catalyst 16 has a function of occluding $NO_x$ in the exhaust gas when the exhaust air-fuel ratio of the engine is lean, and discharging and giving the occluded $NO_x$ when the exhaust air-fuel ratio of the engine is rich or stoichometoric (HC or CO exists in the exhaust gas). The oxidation catalyst 17 has a function of oxidizing and purifying HC or CO in the exhaust gas.

An intake air introduced through the air cleaner 10 into the suction passage 9 is supercharged by the compressor 11a, introduced into the cylinder when a suction valve 18 of each cylinder is opened, compressed with the elevation of the piston 2 and used for combustion as above described. The exhaust gas after combustion is exhausted into the exhaust passage 14, when an exhaust valve 19 is opened, to drive the turbine 11b and then pass through the $NO_x$ catalyst 16 and the oxidation catalyst 17 to be exhausted via the noise eliminator into the atmosphere.

An EGR passage 23 having one end connected to a downstream position of the suction throttle valve 12 in the suction passage 9 and the other end connected to an upstream position of the exhaust throttle valve 15 in the exhaust passage 14 is provided with an EGR valve 21 and an EGR cooler 25. A recirculation of EGR from the exhaust passage 14 to the suction passage 9 is made through the EGR passage 23. When the EGR valve 21 is opened, the exhaust gas cooled by the EGR cooler 25 is recirculationed through the EGR passage 23. The EGR ratio at this time is appropriately adjusted in accordance with an opening state of the EGR valve 21, restriction of the intake air by the suction throttle valve 12, and restriction of the exhaust gas by the exhaust throttle valve 15 (EGR ratio adjusting part).

An ECU (electronic control unit) 31 is installed within a compartment. The ECU comprises an input/output device, a storage device such as ROM and RAM for storing a control program and a control map, a central processing unit (CPU), and a timer counter. On the input side of the ECU 31, various sorts of sensors are connected, including an accelerator sensor 32 for sensing the accelerator operation amount APS, and a rotational speed sensor 33 for sensing the engine rotational speed Ne. On the output side, various sorts of devices are connected, including the fuel injection valve 5, the suction throttle valve 12, the exhaust throttle valve 15, and the EGR valve 21.

The ECU 31 calculates the fuel injection quantity Q from the map (not shown) on the basis of the accelerator operation amount APS and the engine rotational speed Ne, and calculates the fuel injection timing IT from the map on the basis of the engine rotational speed Ne and the fuel injection quantity Q, and controls the fuel injection valve 5 on the basis of these calculated values.

Also, the ECU 31 calculates a target excess air ratio λtgt from the map (not shown) on the basis of the calculated values of the engine rotational speed Ne and the fuel injection quantity Q. The ECU 31 performs a feedback control for the opening state of the EGR valve 21 (i.e., EGR ratio Regr) on the basis of the target excess air ratio λtgt and an actual excess air ratio λ, so that the actual excess air ratio λ becomes equal to the target excess air ratio λtgt. The actual excess air ratio λ may be calculated from a new intake air amount in which an estimated value of the remaining oxygen amount in the EGR gas is added to an intake air amount obtained from the output of an air flow sensor output (not shown), and the fuel injection quantity Q. The actual excess air ratio λ may be obtained from the output of a linear air-fuel ratio sensor provided in the exhaust passage 14.

In the diesel engine of this embodiment, the combustion mode is switched, in accordance with an operating condition of the engine, thereby greatly changing the fuel injection timing IT. Switching of the combustion mode will be detailed below.

Figure 2:
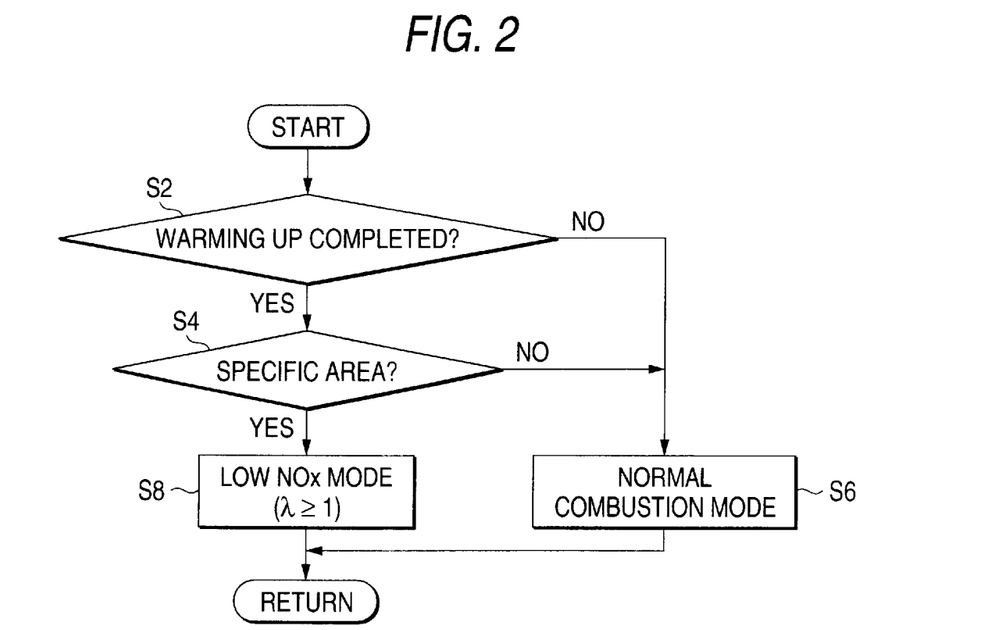
FIG. 2 is a flowchart showing a combustion mode switching routine to be executed by an ECU in the first embodiment.
Figure 3:
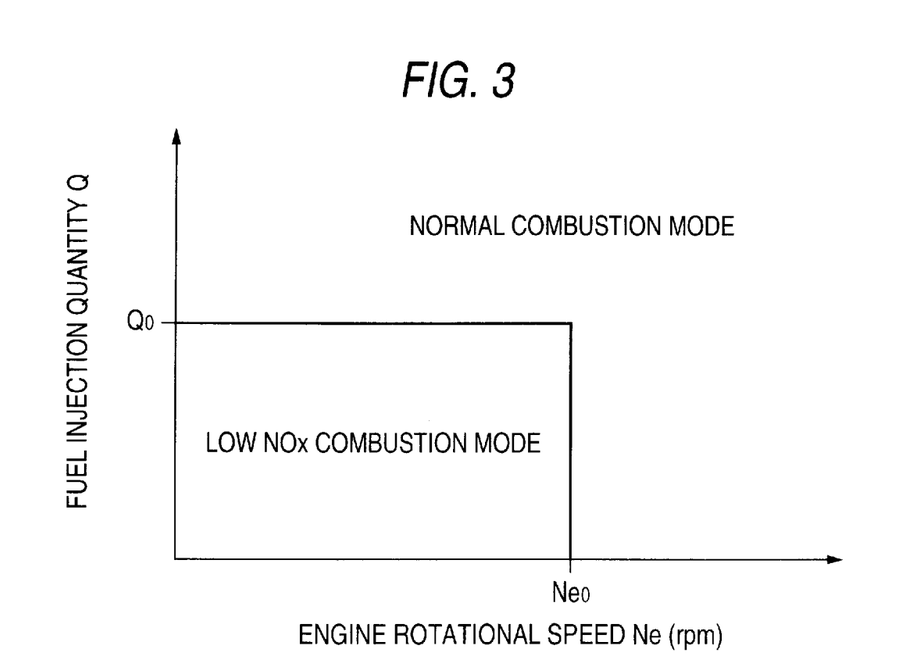
FIG. 3 is an explanatory diagram showing a map for setting up a combustion mode.

FIG. 2 is a flowchart showing a combustion mode switching routine to be performed by the ECU 31. First of all, the ECU 31 determines at step S2 whether or not the warming up of the engine is completed on the basis of the cooling water temperature. Subsequently, at step S4, the ECU 31 determines whether or not the present operating range is a preset specific range, on the basis of the fuel injection quantity Q and the engine rotational speed Ne, and in accordance with the map as shown in FIG. 3. The specific range is set in a low load and low rotational speed range where the fuel injection quantity Q (correlated with the engine load) and the engine rotational speed Ne are equal to or less than the predetermined values Q0 and Ne0.

If NO (negative) determination is made at step S2 or S4, the routine transfers to step S6, where the normal combustion mode (second control mode) is performed, and then the routine is ended (second control means). If YES (affirmative) determination is made at each of steps S2 and S4, the routine goes to step S8, where the low $NO_x$ combustion mode (first control mode) is performed, and then the routine is ended (first control means).

The normal combustion mode is a control mode for making the same control practiced with the typical diesel engine, while the low $NO_x$ combustion mode is a feature of this invention.

FIG. 4 is a characteristic graph showing a control situation for the fuel injection timing IT and the EGR ratio Regr in the normal combustion mode and the low $NO_x$ combustion mode, and the test results of measuring the THC emission amount, $NO_x$ emission amount, noise, and smoke emission amount, when the fuel injection timing IT is set at 8 to 36° BTDC. In FIG. 4, the characteristic is indicated with a sign ● for IT=8° BTDC. In the same manner, the characteristic is indicated with sign ○ for 10° BTDC, sign ▲ for 12° BTDC, sign △ for 14° BTDC, sign x for 16° BTDC, sign ★ for 20° BTDC, sign ◆ for 24° BTDC, sign ◇ for 28° BTDC, sign ■ for 32° BTDC, and sign □ for 36° BTDC. The test results are obtained when the operating range of the engine has a target average effective pressure Pe of 0.2 MPa (correlated with the engine load) and an engine rotational speed of 2000 rpm.

A calibration point in the normal combustion mode is at a position of large sign ●, in which the fuel injection timing IT is set at 8° BTDC, the EGR ratio Regr is set at 45%, and the excess air ratio is controlled to be around 1.8. On the contrary, the calibration point in the low $NO_x$ combustion mode is at a position of large sign □, in which the fuel injection timing IT is set at 36° BTDC on the far advance side, and the EGR ratio Regr is set at 56%, so that the excess air ratio λ is controlled to be 1.0 or on the slightly lean side (k≧1.0). The fuel injection timing IT=36° BTDC in the low $NO_x$ combustion mode is set in the following way.

FIG. 5 is a characteristic graph showing the test results excerpted from FIG. 4, when the fuel injection timing IT is 10, 20 and 36° BTDC. In FIG. 5, IT=10° BTDC as indicated by sign ○ corresponds to the fuel injection timing IT (close to the normal combustion mode) that is applied to the typical diesel engine, IT=20° BTDC as indicated by sign ★ corresponds to the fuel injection timing IT that is applied in JP-B-3116876 (U.S. Pat. No. 5,937,639), and IT=36° BTDC as indicated by sign □ corresponds to the fuel injection timing IT in the low $NO_x$ combustion mode of this embodiment.

In 10° BTDC, the $NO_x$ emission is decreased as the EGR ratio Regr is increased, but since the smoke is rapidly increased beyond λ=1.8 (though omitted in the figure), the upper limit value of the EGR ratio Regr that can suppress the exhaust of smoke is considerably low.

Also, in 20° BTDC, the smoke emission amount tends to be once increased as the EGR ratio Regr is increased, and tends to be decreased after the peak. Near λ=1.05 as the minimum value, the smoke can not be fully reduced, the peak of smoke emission amount is exceeded, every time the excess air ratio λ is changed as the combustion mode is switched. Therefore, it is estimated that the smoke emission amount is rapidly increased transiently.

On the contrary, in 36° BTDC at which the fuel injection timing IT is further advanced, the smoke emission amount is suppressed to the extremely low value, even when the EGR ratio Regr is increased to about 56%. Consequently, the realizable excess air ratio λ is extended over the range near 1.0. Since the $NO_x$ emission is suppressed by the high EGR ratio Regr, this fuel injection timing IT permits both the smoke and $NO_x$ to be reduced. Further, since no peak of the smoke emission amount is formed, a transient increase of the smoke is suppressed.

In this way, the smoke emission amount is suppressed by advancing the fuel injection timing IT, because the period from fuel injection to ignition is extended to promote the premix of injected fuel and intake air. The fuel injection timing IT is not advanced extremely up to the suction stroke like in JP-A-8-218920 (U.S. Pat. No. 5,732,554). Thus, even in the low $NO_x$ combustion mode, the injected fuel is surely ignited at a certain timing near the top dead center of compression, enabling the stable operation to be made without ignition failure.

Even in this 36° BTDC, if the excess air ratio λ is set on the rich side beyond 1.0, the smoke is increased, and the HC or CO emission is increased as the excess air is decreased (FIG. 4). To avoid these drawbacks, the excess air ratio λ in the low $NO_x$ combustion mode is set on the slightly lean side from 1.0.

FIG. 6 is a characteristic graph showing the test results measuring the THC emission and the dilution fuel amount by changing the fuel injection timing IT in the same operating range as in FIGS. 4 and 5. As shown in FIG. 6, if the fuel injection timing IT is advanced, THC is increased from around 40° BTDC, and the dilution fuel amount (amount of fuel mixed into the engine oil to make the dilution effect) is increased, bringing about a danger of oil dilution. For example, a part of the fuel injected by early fuel injection is diffused and deposited on the cylinder wall face without being captured in the cavity 2a of the piston 2, and deposited fuel is exhausted as THC, or mixed into the oil of an oil pan through a piston clearance. Also, if the mixture of fuel spray and the intake air is not fully made by some factor such as cavity lip or reverse squish flow, the smoke is increased. Thus, the excessive advance is undesirable from this respect.

Moreover, when the fuel injection timing IT is excessively advanced, the ignition timing of fuel near the top dead center of compression is dispersed, likely causing an ignition failure such as preignition or ignition delay, as in JP-A-8-218920 (U.S. Pat. No. 5,732,554) in which the fuel injection is performed in the suction stroke. Therefore, there is a limit for the advance to avoid this drawback.

Therefore, the fuel injection timing IT is restricted to 40° BTDC on the advance side. Consequently, the fuel injection timing IT in the low $NO_x$ combustion mode is set to 36° BTDC, as above described.

In this low $NO_x$ combustion mode, since a large quantity of EGR is recirculationed to suppress $NO_x$, the amount of air to combust a large quantity of fuel is insufficient in an area with high engine load or engine rotational speed Ne, whereby there is some restriction in the respects of the engine load and the engine rotational speed Ne, and it is limited in a specific area of the map in FIG. 3. In this embodiment, a relatively large amount of air can be supplied owing to supercharging of the turbo charger 11 in the low $NO_x$ combustion mode, whereby the upper limit value in the specific area is significantly extended as compared with the diesel engine of natural suction type.

The optimal fuel injection timing IT is changed in accordance with the operating range of the engine in the specific area, wile the dependency on the fuel injection quantity (engine load) is low. Also, the optimal fuel injection timing IT is greatly changed in accordance with the engine rotational speed Ne.

If both the engine rotational speed Ne and the piston speed are increased, the timing at which the injected fuel arrives to the cavity 2a is relatively earlier. Therefore, to allow the injected fuel to arrive to the cavity at an appropriate timing, it is necessary to put forward the fuel injection up to the timing at which the piston is still at a low position. Hence, the fuel injection timing IT is set to be on the advance side as the engine rotational speed Ne is increased in the specific area of the map as shown in FIG. 3, while the fuel injection timing IT is set to be almost constant regardless of the fuel injection quantity fluctuation.

On the other hand, if the combustion mode is switched upon a change in the operating range of the engine, the fuel injection timing IT is switched among 8° BTDC and 36° BTDC, and the excess air ratio λ is switched among 1.8 and 1.0 (between 45% and 56% in the EGR ratio Regr), as described with reference to FIG. 4.

In the fuel injection control of the common rail system with high response ability, the fuel injection timing IT can be switched stepwise, but since the EGR ratio Regr is gently changed due to recirculation of the exhaust gas in the EGR control, the EGR ratio Regr has a transient range at the mode switching time. At the mode switching time, the fuel injection timing IT is not tailed in accordance with the change of the EGR ratio Regr, as indicated by the broken line in FIG. 4, but is changed stepwise at a predetermined point during the EGR ratio change period (mode switching means), as indicated by the solid line. The necessity for such control at the mode switching time will be described below.

As shown in FIG. 4, when the fuel injection timing IT is set somewhere from 14 to 32° BTDC in a transient range of the excess air ratio λ from 1.0 to 1.8, there occurs a phenomenon that the noise is increased mainly on the lean side, or the smoke is increased mainly on the rich side. Hence, the noise reduction and the smoke reduction cannot be achieved. If the fuel injection timing IT is tailed in accordance with the broken line of FIG. 4, the range of 14 to 32° BTDC is necessarily passed, whereby it is not possible to avoid the region where the noise or the smoke is rapidly increased.

On the contrary, when the fuel injection timing IT is set at 8 or 10° BTDC, the noise and the smoke can be reduced in the region on the lean side from the excess air ratio λ of about 1.3. On the other hand, when the fuel injection timing IT is set at 36° BTDC, the noise and the smoke can be reduced in the region on the rich side from the excess air ratio λ of about 1.3.

Hence, when the normal combustion mode is switched to the low $NO_x$ combustion mode, the fuel injection timing IT is gradually increased to from 8 to 10° BTDC and then changed to 36° BTDC stepwise at λ=1.3 in the area where the excess air ratio λ is 1.3 or more. Also, when the low $NO_x$ combustion mode is switched to the normal combustion mode, the reverse procedure is followed.

On the other hand, in the low $NO_x$ combustion mode in which the excess air ratio λ is set on the rich side as compared with the normal combustion mode, the torque is decreased with the same injection quantity. Accordingly, the required fuel amount is obtained beforehand for each excess air ratio λ, and the actual fuel injection quantity Q is corrected in accordance with the excess air ratio λ in this embodiment, whereby the torque variation is prevented at the time of switching the combustion mode.

In the diesel engine of this embodiment, noting that the upper limit value of the EGR ratio Regr to suppress the exhaust of smoke is increased in an area where the fuel injection timing IT is greatly advanced as compared with the typical value, the low $NO_x$ combustion mode in which the fuel injection timing IT is set on the advance side is performed in a specific area with low rotational speed and low load, whereby both the smoke and $NO_x$ can be reduced at extremely high order.

Also, the amount of air is kept by supercharging of the turbo charger 11 in this embodiment to extend the upper limit in the specific area where the low $NO_x$ combustion mode is performed, whereby there are obtained advantages of the low $NO_x$ combustion mode in the wide operating range.

In addition, the fuel injection timing IT in the low $NO_x$ combustion mode is set in consideration of lower stability due to ignition failure, occurrence of oil dilution, and advance limit caused by an increase in THC, whereby the above effect can be achieved by preventing these troubles beforehand.

Since the fuel injection timing IT is advanced along with an increase in the engine rotational speed Ne, the injected fuel can be always brought into the cavity 2a of the piston 2 at an appropriate timing, irrespective of the engine rotational speed Ne. Consequently, a combustion state consistent with the smoke and $NO_x$ can be stably realized.

Further, considering that the fuel injection timing IT is less dependent on an increase or decrease in the fuel injection quantity (engine load), the fuel injection timing IT is kept almost constant against the increase or decrease in the fuel injection quantity Q, the combustion state consistent with the smoke and $NO_x$ can be stably realized without being affected by the variation in the engine load.

The EGR ratio Regr is adjusted to be near the upper limit value (56%) to suppress the exhaust of the smoke in the low $NO_x$ combustion mode, and the excess air ratio λ is adjusted to be on the slightly lean side from 1.0, as described in the example of FIG. 5 (operating range where Pe=0.2 MPa and Ne=2000 rpm). In other operating ranges, the EGR ratio Regr and the excess air ratio λ are similarly adjusted. And the EGR ratio Regr is increased as greatly as possible in this manner, the maximum $NO_x$ reduction effect is obtained, and the excess air ratio λ is suppressed to be on the lean side from 1.0, whereby HC and CO can be effectively suppressed. Consequently, the comprehensive emission exhaust characteristics can be improved.

Since a large quantity of EGR causes the excess air to be decreased in the low $NO_x$ combustion mode, the HC or CO emission is slightly increased as compared with the normal combustion mode. This phenomenon can be estimated from the THC characteristics in FIG. 4. However, the aftertreatment of HC or CO is simpler than that of the smoke, and can be surely oxidized and purged by the oxidation catalyst 17 in the exhaust passage 14. On the other hand, when the oxidation catalyst 17 is not activated, the determination at step S2 in FIG. 2 is NO, the low $NO_x$ combustion mode is disabled, and switched to the normal combustion mode where HC or CO emission is smaller. Consequently, the HC or CO emission can be surely prevented in any operating range.

The low $NO_x$ combustion mode is enabled in the specific range, and getting out of the specific range along with the increase in the fuel injection quantity Q or engine rotational speed Ne, it is switched to the normal combustion mode, as with the typical diesel engine. In this way, it is possible to surely comply with a request output from the driver, and realize the excellent running characteristics of the vehicle. Particularly in this embodiment, since the exhaust gas cooled by the EGR cooler 25 is recirculationed, the feasible engine torque is increased, making it possible to enhance the running characteristics of the vehicle.

At the time of switching the combustion mode, the fuel injection timing IT is changed stepwise at the predetermined point (λ=1.3) without tailing in accordance with a change in the EGR ratio Regr. Accordingly, the mode switching is made beyond the area (IT=14 to 32° BTDC) where the noise or smoke is rapidly increased in the transient range of the EGR ratio Regr, thereby avoiding in advance the temporary increase in the noise or smoke caused by the mode switching.

In the low $NO_x$ combustion mode, the fuel injection timing IT is set to 36° BTDC, but at 32° BTDC or 28° BTDC, the noise and smoke characteristics are hardly aggravated. Accordingly, in the low $NO_x$ combustion mode assuming this operating range, the lower limit of the fuel injection timing IT is 28° BTDC, and the upper limit is 40° BTDC as restricted by the oil dilution. The fuel injection timing IT may be set arbitrarily within that interval.

Second Embodiment

A second embodiment of the diesel engine embodying the present invention will be described below. The diesel engine of this embodiment is different from that of the first embodiment, in that a process of purging NOx occluded into the $NO_x$ catalyst 16 is additionally provided. Other parts are common. Hence, the description for the common parts is omitted, and different points are mainly explained.

In the low $NO_x$ combustion mode, the $NO_x$ emission is reduced, but the complete exhaust suppression is difficult. On the other hand, in the normal combustion mode, the $NO_x$ exhaust characteristics of the typical diesel engine are attained, whereby the exhausted $NO_x$ is occluded into the $NO_x$ catalyst 16, and prevented from being exhausted into the atmosphere. Thus, when the low $NO_x$ combustion mode is executed, the process of discharging and reducing $NO_x$ occluded into the $NO_x$ catalyst 16 is required. In this embodiment, $NO_x$ is purged by executing an $NO_x$ purge combustion mode in which the fuel injection timing IT is greatly advanced as in the low $NO_x$ combustion mode.

Figure 7:
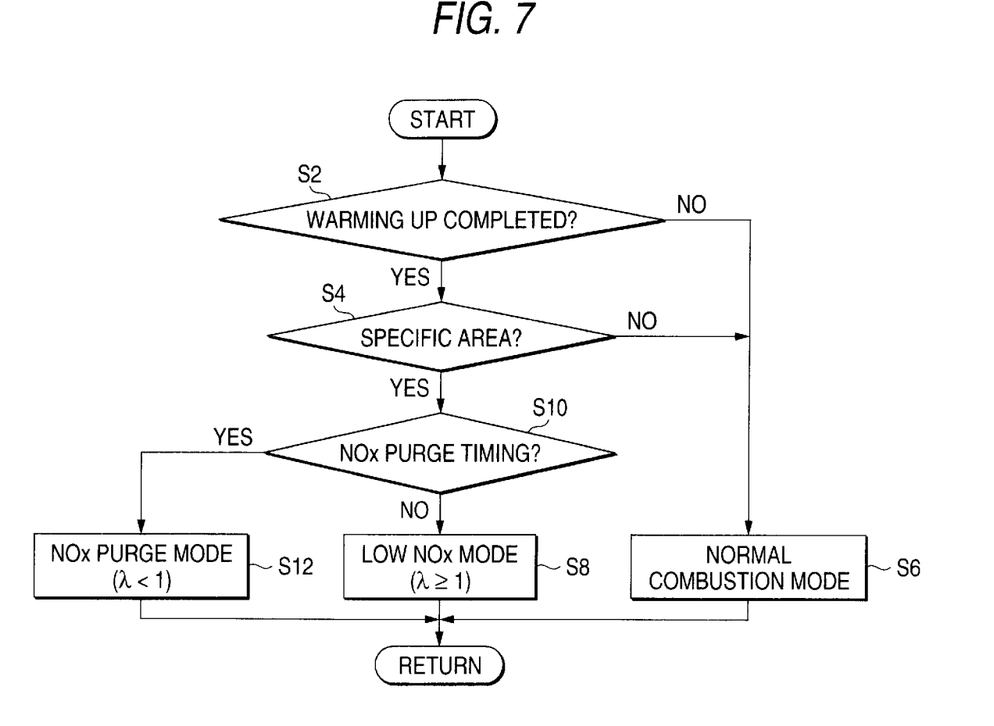
FIG. 7 is a flowchart showing a combustion mode switching routine to be executed by the ECU in a second embodiment.

FIG. 7 is a flowchart showing the combustion mode switching routine to be executed by the ECU 31. At step S4, a determination is made whether or not the present operating range is in the specific region. If YES, the routine goes to step S10 to determine whether or not it is $NO_x$ purge timing to purge $NO_x$. Various determination methods can be used. For example, when the sensed value of the $NO_x$ sensor is greater than or equal to a predetermined value and leakage of $NO_x$ from the $NO_x$ catalyst 16 is guessed, or when the $NO_x$ emission estimated from the operating range of the engine is added up successively to obtain the $NO_x$ occluded quantity on the $NO_x$ catalyst 16 and its value exceeds a predetermined value, the $NO_x$ purge timing is supposed.

If the determination at step S10 is NO because it is not the $NO_x$ purge timing, the routine goes to step S8 to execute the low $NO_x$ combustion mode. On the contrary, if the determination at step S10 is YES as the $NO_x$ purge timing, the routine transfers to step S12 to execute the $NO_x$ purge combustion mode.

In FIG. 4, the calibration point of the $NO_x$ purge combustion mode is indicated by large sign □ on the broken line, in which the fuel injection timing IT is set to the same value (36° BTDC in FIG. 4) as in the low $NO_x$ combustion mode, and the excess air ratio λ is set to be on the slightly rich side from 1.0 (λ<1.0), which is different from that of the low $NO_x$ combustion mode. That is, as will be apparent from the characteristics of FIG. 4, the increase of smoke due to a large quantity of EGR (naturally the increase of $NO_x$) is suppressed in the area where the fuel injection timing IT is greatly advanced, whereby the excess air ratio λ is adjusted to be on the rich side, which is impossible with the typical diesel engine. And since the HC or CO emission is increased along with the decrease in excess oxygen (estimated in the THC characteristic), HC or CO is supplied as reducing agent to the $NO_x$ catalyst 16 to exhibit the discharge/reduction action of $NO_x$.

In the diesel engine of this embodiment, in addition to the effects of the first embodiment, when the $NO_x$ purge timing is reached, the $NO_x$ purge combustion mode is executed in which the excess air ratio λ is adjusted to be on the rich side while the increase of smoke is suppressed. Therefore, there is the effect of discharging and reducing $NO_x$ on the $NO_x$ catalyst 16 without worrying about the increase of smoke.

Though the embodiments of the invention have been described above, the invention is not limited to those embodiments. For example, in the first and second embodiments, the diesel engine is constituted as the common rail system for the precise control of the fuel injection timing IT, comprising supercharging by the turbo charger 11 to extend the specific area of the low $NO_x$ combustion mode, and activating the EGR cooler 25 to increase the engine torque. However, this invention is not limited to those embodiments, but may be embodied for the typical diesel engine in which the fuel injection is controlled with a governor, the turbo charger 11 is a variable nozzle type, or the turbo charger 11 or the EGR cooler 25 is omitted.

In the first and second embodiments, the control states for the fuel injection timing IT, the EGR ratio Regr, and the excess air ratio λ are exemplified, on the basis of the characteristics of FIGS. 4 to 6 corresponding to the predetermined operating range (Pe=0.2 MPa, Ne=2000 rpm). As above described, these settings are varied in accordance with the operating range, or different by changing the specification of the engine. Accordingly, they may be naturally set on the basis of the characteristics corresponding to the operating range or the specification of the engine, without being limited to the above settings.

Moreover, in the first and second embodiments, the first control mode (low $NO_x$ combustion mode) and the other mode are switched in accordance with the situation. However, the first control mode may be made over the entire range, or in the specific operating range at any time.

What is claimed is:

1. A control device for a diesel engine comprising:
   a fuel injection part for injecting a fuel into a combustion chamber of an engine;
   an EGR ratio adjusting part for adjusting a recirculation amount of exhaust gas exhausted from the engine into an intake air system; and
   a controller for controlling the operation of the fuel injection part and the EGR ratio adjusting part,
   wherein the controller sets up a fuel injection timing of the fuel injection part at an advance side from an injection timing when a smoke emission characteristic indicates a decreasing tendency after indicating an increasing tendency in accordance with an increase in EGR ratio, and at a lag side from an injection timing when the injected fuel gets out of a cavity formed in a piston and gets to a cylinder wall face, and the controller executes a first control mode for controlling the operation of the EGR ratio adjusting part to reduce a smoke emission amount and a $NO_x$ emission amount from the engine.

2. The control device for a diesel engine according to claim 1, wherein the controller advances the fuel injection timing in accordance with an increase of engine rotational speed.

3. The control device for a diesel engine according to claim 2, wherein the controller keeps the fuel injection timing almost constant regardless of a change in an engine load.

4. The control device for a diesel engine according to claim 1, wherein the controller controls the operation of the EGR ratio adjusting part to set the EGR ratio to be 50% or more and set an excess air ratio to be 1.0 or more.

5. The control device for a diesel engine according to claim 1, wherein the engine has a catalyst having an oxidation function in an exhaust system, and the controller inhibits execution of the first control mode when the catalyst is inactive.

6. The control device for a diesel engine according to claim 1, wherein the controller can execute a second control mode in which the fuel injection timing of the fuel injection part is set near a top dead center of compression to lag behind the first control mode, and in which the EGR ratio is lower than in the first control mode, and
   wherein the fuel injection timing is momentarily switched in the middle during an EGR ratio change period where the EGR ratio is gradually changed, when switching between the first control mode and the second control mode depending on the operating conditions of the engine.

7. The control device for a diesel engine according to claim 1, wherein the controller switches between the first control mode and a second control mode in which the fuel injection timing of the fuel injection part is set near a top dead center of compression to lag behind the first control mode, and in which the EGR ratio is lower than in the first control mode, depending on the operating conditions of the engine, and
   wherein the first control mode is executed in a low load and low rotational speed range of the engine.

8. The control device for a diesel engine according to claim 1, wherein the engine has an $NO_x$ catalyst for occluding $NO_x$ in an exhaust system, and the controller controls the operation of the fuel injection part and the EGR ratio adjusting part to set the fuel injection timing to be almost equal to that of the first control mode and set an excess air ratio to be less than 1.0 at a time of purging $NO_x$ from the $NO_x$ catalyst.

9. A control method for a diesel engine comprising:
   injecting a fuel into a combustion chamber of an engine by a fuel injection part; and
   adjusting a recirculation amount of exhaust gas exhausted from the engine into an intake air system by a EGR ratio adjusting part;
   wherein a fuel injection timing of the fuel injection part is set up at an advance side from an injection timing when a smoke emission characteristic indicates a decreasing tendency after indicating an increasing tendency in accordance with an increase in EGR ratio, and at a lag side from an injection timing when the injected fuel gets out of a cavity formed in a piston and gets to a cylinder wall face, and the operation of the EGR ratio adjusting part is controlled to reduce a smoke emission amount and a $NO_x$ emission amount from the engine.

10. The control method for a diesel engine according to claim 9, wherein the fuel injection timing is advanced in accordance with an increase of engine rotational speed.

11. The control method for a diesel engine according to claim 10, wherein the fuel injection timing is kept almost constant regardless of a change in an engine load.

12. The control method for a diesel engine according to claim 9, wherein the operation of the EGR ratio adjusting part is controlled to set the EGR ratio to be 50% or more and set an excess air ratio to be 1.0 or more.

13. The control method for a diesel engine according to claim 9, wherein the engine has a catalyst having an oxidation function in an exhaust system, and execution of the control is inhibited when the catalyst is inactive.

14. The control method for a diesel engine according to claim 9, wherein the engine includes: a first control mode in which the fuel injection timing of the fuel injection part is set up at the advance side from the injection timing when the smoke emission characteristic indicates the decreasing tendency after indicating the increasing tendency in accordance with the increase in the EGR ratio, and at the lag side from the injection timing when the injected fuel gets out of the cavity formed in the piston and gets to the cylinder wall face, and the operation of the EGR ratio adjusting part is controlled to reduce the smoke emission amount and the $NO_x$ emission amount from the engine; and a second control mode in which the fuel injection timing of the fuel injection part is set near a top dead center of compression to lag behind the first control mode, and the EGR ratio is lower than in the first control mode, and
   wherein the injection timing is momentarily switched in the middle during an EGR ratio change period where the EGR ratio is gradually changed, when the control mode is switched between the first control mode and the second control mode, depending on the operating conditions of the engine.

15. The control method for a diesel engine according to claim 9, wherein the engine includes: a first control mode in which the fuel injection timing of the fuel injection part is set up at the advance side from the injection timing when the smoke emission characteristic indicates the decreasing tendency after indicating th increasing tendency in accordance with the increase in the EGR ratio, and at the lag side from the injection timing when the injected fuel gets out of the cavity formed in the piston and gets to the cylinder wall face, and the operation of the EGR ratio adjusting part is controlled to reduce the smoke emission amount and the $NO_x$ emission amount from the engine; and a second control mode in which the fuel injection timing of the fuel injection part is set near a top dead center of compression to lag behind the first control mode, and the EGR ratio is lower than in the first control mode, and wherein the first control mode is executed in a low load and low rotational speed range of the engine.

16. The control method for a diesel engine according to claim 9, wherein the engine has an $NO_x$ catalyst for occluding $NO_x$ in an exhaust system, and upon a timing of purging $NO_x$ from the $NO_x$ catalyst, the fuel injection timing of the fuel injection part is set up at the advance side from the injection timing when the smoke emission characteristic indicates the decreasing tendency after indicating the increasing tendency in accordance with the increase in the EGR ratio, and at the lag side from the injection timing when the injected fuel gets out of the cavity formed in the piston and gets to the cylinder wall face, and wherein the operation of the EGR ratio adjusting part is controlled to set the excess air ratio to be less than 1.0.

17. A diesel engine comprising:

a combustion chamber defined by a cylinder wall face;

a piston having a cavity;

a fuel injection part for injecting a fuel into the combustion chamber;

an intake air system;

an EGR ratio adjusting part for adjusting a recirculation amount of exhaust gas exhausted from the engine into the intake air system; and a controller for controlling the operation of the fuel injection part and the EGR ratio adjusting part, wherein the controller sets up a fuel injection timing of the fuel injection part at an advance side from an injection timing when a smoke emission characteristic indicates a decreasing tendency after indicating an increasing tendency in accordance with an increase in EGR ratio, and at a lag side from an injection timing when the injected fuel gets out of the cavity and gets to the cylinder wall face, and the controller executes a first control mode for controlling the operation of the EGR ratio adjusting part to reduce a smoke emission amount and a $NO_x$ emission amount from the engine.

* * * * *